(12) United States Patent
Luong

(10) Patent No.: US 11,898,690 B1
(45) Date of Patent: Feb. 13, 2024

(54) SPHERICAL FIELD OF VIEW (FOV) MULTIPLE PAYLOADS GIMBAL SYSTEM AND METHOD OF MANUFACTURING AND USING THE SAME

(71) Applicant: Quoc Viet Luong, Castro Valley, CA (US)

(72) Inventor: Quoc Viet Luong, Castro Valley, CA (US)

( * ) Notice: Subject to any disclaimer, the term of this patent is extended or adjusted under 35 U.S.C. 154(b) by 0 days.

(21) Appl. No.: 18/061,462

(22) Filed: Dec. 4, 2022

(51) Int. Cl.
| | | |
|---|---|---|
| F16M 11/12 | (2006.01) |
| G05B 6/02 | (2006.01) |
| B64D 47/08 | (2006.01) |
| B64U 20/87 | (2023.01) |
| G03B 17/56 | (2021.01) |
| B64C 39/02 | (2023.01) |

(52) U.S. Cl.
CPC ............. *F16M 11/123* (2013.01); *G05B 6/02* (2013.01); *B64C 39/024* (2013.01); *B64D 47/08* (2013.01); *B64U 20/87* (2023.01); *G03B 17/561* (2013.01)

(58) Field of Classification Search
CPC ...... F16M 11/123; G05B 6/02; B64C 39/024; B64D 47/08; B64U 20/87; G03B 17/561
See application file for complete search history.

(56) References Cited

U.S. PATENT DOCUMENTS

| | | | | |
|---|---|---|---|---|
| 10,577,125 | B1* | 3/2020 | Burtt .................... | G03B 15/006 |
| 2009/0289850 | A1* | 11/2009 | Liu ........................ | H01Q 21/28 |
| | | | | 342/359 |
| 2016/0177704 | A1* | 6/2016 | Van Steenwyk ....... | G01C 25/00 |
| | | | | 166/255.2 |
| 2017/0159875 | A1* | 6/2017 | Wagner ................ | G03B 17/563 |
| 2019/0163039 | A1* | 5/2019 | Zhang ................... | G05D 1/101 |
| 2021/0362839 | A1* | 11/2021 | Nakazawa ............. | G05D 1/102 |

OTHER PUBLICATIONS

Novoflex (Double Gimbal Head FALCON, 5 pages, Apr. 6, 2022 retrieved from internet [online], URL>https://web.archive.org/web/20220406165226/https://www.novoflex.de/en/products-637/camera-support-systems/double-gimbal-head/double-gimbal-head-products/FALCON.html Jun. 26, 2023) (Year: 2022).*

* cited by examiner

*Primary Examiner* — Shon G Foley

(57) ABSTRACT

A method and a spherical field of view gimbal system ("gimbal system") are provided, comprising: a suspension arm having a first terminal and a second terminal; a first gimbal arm connected to the suspension arm; a second L-shaped gimbal arm connected to the gimbal arm; and a third L-shaped gimbal arm connected to the first gimbal arm; and controller circuit configured to measure the errors in rotational angles and adjust the rotations of the second L-shaped gimbal arm and second L-shaped gimbal arm accordingly.

20 Claims, 8 Drawing Sheets

(PRIOR-ART)

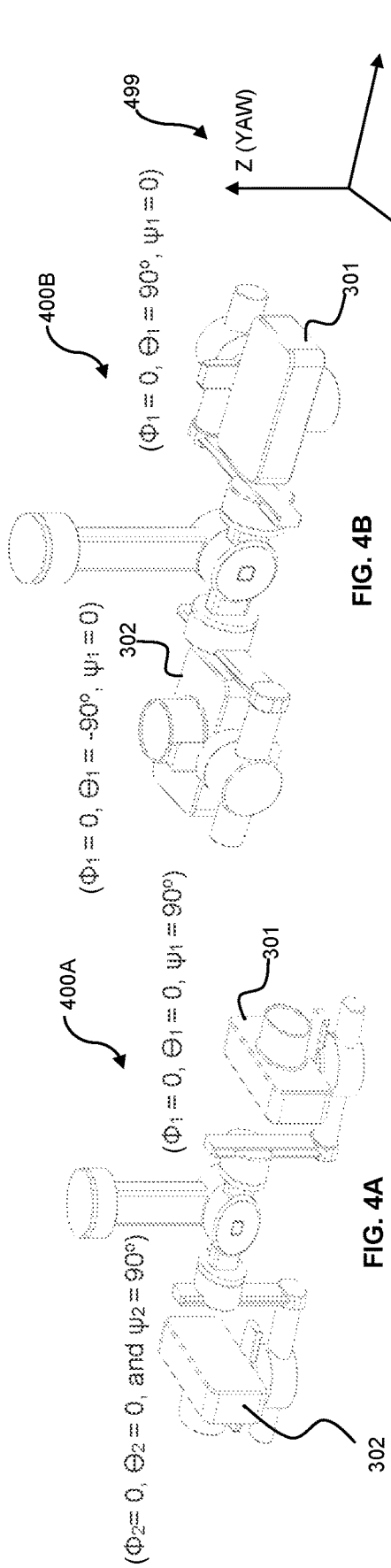
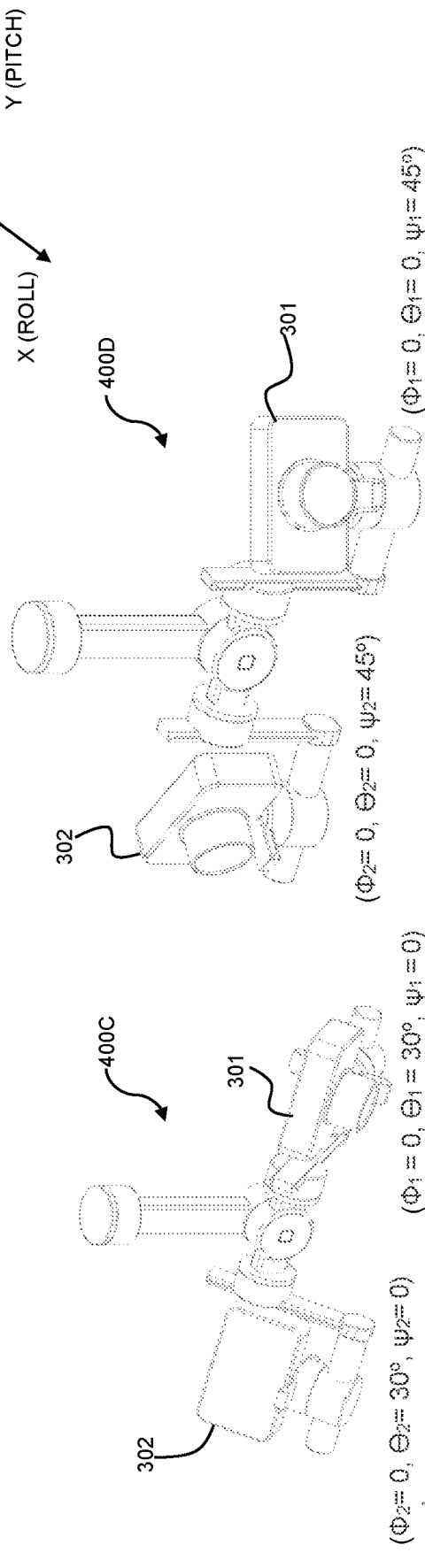
FIG. 4A
FIG. 4B
FIG. 4C
FIG. 4D

US 11,898,690 B1

SPHERICAL FIELD OF VIEW (FOV) MULTIPLE PAYLOADS GIMBAL SYSTEM AND METHOD OF MANUFACTURING AND USING THE SAME

FIELD OF THE INVENTION

The present invention relates generally to the field of auto tracking gimbals. More specifically, the present invention relates to a system of multiple auto tracking gimbals with wide field of view (FOV).

BACKGROUND ART

Auto tracking or lock gimbals are used ubiquitously in aerospace, civilian, and military applications. In military applications, gimbals are used to guide missiles, to fly unmanned aerial vehicles (UAV), to target precise weapons, and to control airborne tactical surveillance. In aerospace, gimbals are used in navigation systems and instrument panels. NASA uses gimbals in almost everything including the Apollo, Gemini, and all other space missions. In civilian or industrial applications, gimbals are used in photography and videography to stabilize cameras as well as in navigation for commercial ships.

Now referring to FIG. 1, a prior-art 3-axis gimbal 100 illustrates their operating principles. In general, prior-art gimbals 100 have limited field of view (FOV) due to their intrinsic designs. Basically, prior-art gimbal 100 includes a first gimbal frame (yaw) 101, a second gimbal frame (roll) 111, and a third gimbal frame (pitch) 120, all rotatably coupled together. First gimbal arm 101 further includes a position adjustment slot 102, a yaw motor 103, a first rotating ball nut 104 rotated by yaw motor 103. Second gimbal frame 111 is a U-shaped that includes a second position adjustment slot 112, a roll motor 113, and a second rotating ball nut 114 connected to one end of first gimbal frame 101. Third gimbal frame 120 is designed to support a camera payload (not shown). Third gimbal frame 120 further includes a bottom horizontal bar 121 with a payload lock 127, a pair of vertical supports 122-123 with height adjusting screws 125-126 respectively, and a top horizontal bar 124. The entire third gimbal frame 120 is tilted by virtue of a pair of pitch motors 127 and 128. Other electrical components such as inertia measurement unit, (IMU), gimbal control unit (GCU), and batteries are not shown in FIG. 1.

In operations, prior-art gimbal 100 is panned 360° on a yaw plane 131 around the Z-axis of a Cartesian coordinate system 199 because of yaw motor 103. Prior-art gimbal 100 is also barrel rolled 360° on a roll plane 132 around the X-axis by roll motor 113. Finally, prior-art gimbal 100 is tilted up and down only 180° on a pitch plane 133 around the y-axis. The geometry of second gimbal frame 111 blocks the rear view of the payload (not shown). Adjustment slots 102, 112, 125, and 126 are used to adjust the central of gravity of the payload to be coincided to that of gimbal structure consisting of three frames 101, 111, and 120. The operating principles and models for prior-art gimbal 100 are well-known in the related arts and thus will not be discussed in details. Other commercially available gimbals such as DJI Inspire 1, Walkera Voyage 3, the retractable arms allow these models to pan 360°. However, they can only roll around +15/−15° and tilt −90 to 15°.

Therefore what is needed is novel design of a gimbal that has unlimited field of view (FOV) in all yaw, roll, and tilt axes.

What is needed is a gimbal system that can mount multiple payloads, each having unrestrained field of view (FOV).

In addition, what is needed is method for achieving lock or auto tracking with unrestricted field of view (FOV).

What is needed is a method for constructing a multiple payload gimbal system with unrestricted field of view (FOV).

The gimbal system and method of the present invention meets the above needs and solve the above problems beleaguering the prior-art gimbals.

SUMMARY OF THE INVENTION

Accordingly, an object of the present invention is to provide a method and a spherical field of view gimbal system ("gimbal system") are provided, comprising: a suspension arm having a first terminal and a second terminal; a first gimbal arm connected to the suspension arm; a second L-shaped gimbal arm connected to the gimbal arm; and a third L-shaped gimbal arm connected to the first gimbal arm; and controller circuit configured to measure the errors in rotational angles and adjust the rotations of the second L-shaped gimbal arm and second L-shaped gimbal arm accordingly.

Another object of the present invention is to provide a method for achieving a gimbal system that has unhindered spherical field of view.

Yet another object of the present invention is to provide a method for achieving accurate Euler angles of rotation in 3D space.

Another object of the present invention is to provide a simple gimbal frame that has no blind spots.

Another object of the present invention is to provide a method and a gimbal system for carrying multiple payloads, each without visual restrictions.

These and other advantages of the present invention will no doubt become obvious to those of ordinary skill in the art after having read the following detailed description of the preferred embodiments, which are illustrated in the various drawing and figures.

BRIEF DESCRIPTION OF THE DRAWINGS

The accompanying drawings, which are incorporated in and form a part of this specification, illustrate embodiments of the invention and, together with the description, serve to explain the principles of the invention.

FIG. 4A-FIG. 4D are perspective diagrams illustrating the various spherical spanning of the gimbal lock system in accordance with many exemplary aspects of the present invention;

Figure 1:
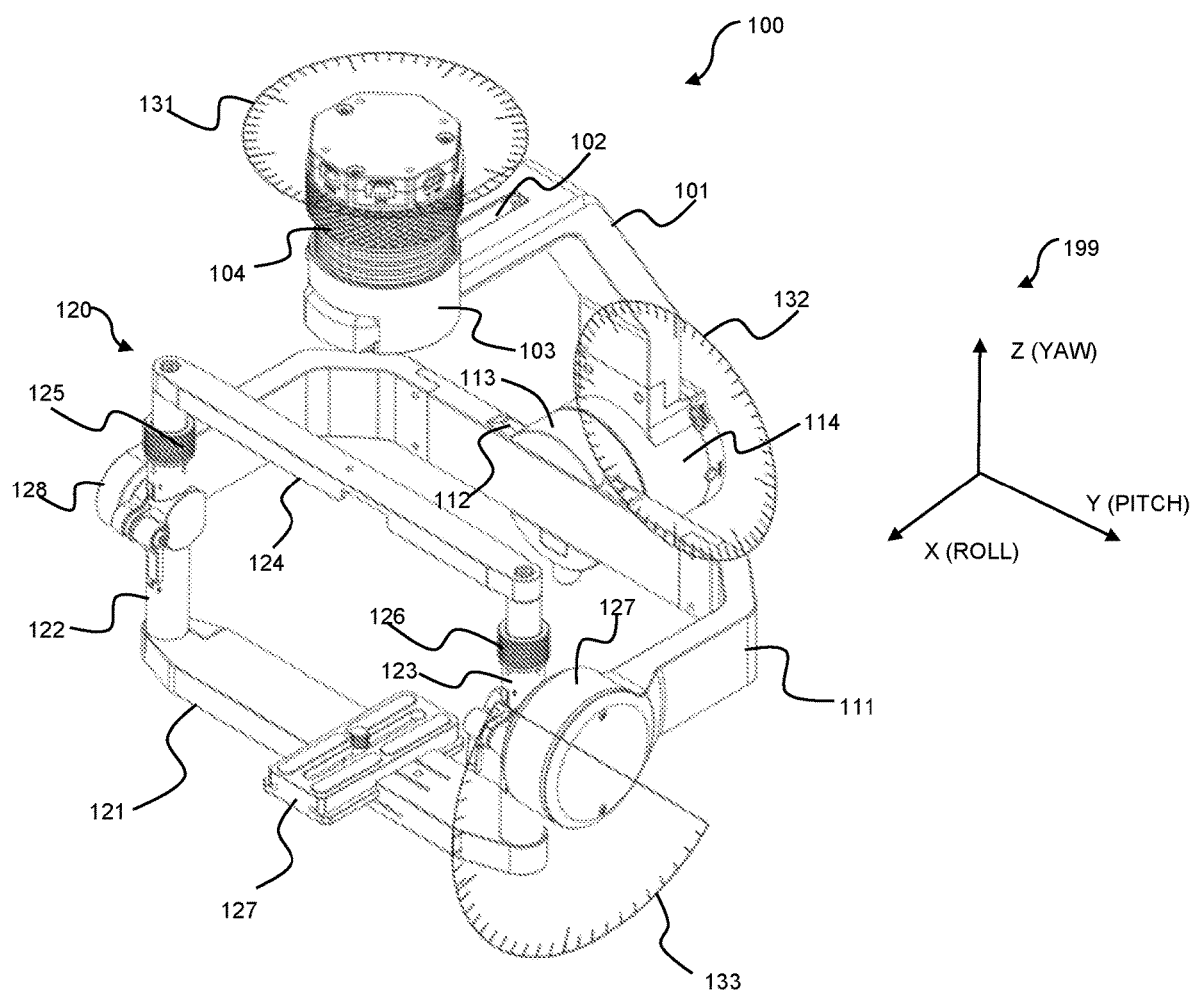
FIG. 1 is a prior-art three-axis gimbal device that suffers from limited yaw field of view due to its geometrical design.

The figures depict various embodiments of the technology for the purposes of illustration only. A person of ordinary skill in the art will readily recognize from the following discussion that alternative embodiments of the structures and methods illustrated herein may be employed without departing from the principles of the technology described herein.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Within the scope of the present description, the reference to "an embodiment" or "the embodiment" or "some embodiments" means that a particular feature, structure or element described with reference to an embodiment is comprised in at least one embodiment of the described object. The sentences "in an embodiment" or "in the embodiment" or "in some embodiments" in the description do not therefore necessarily refer to the same embodiment or embodiments. The particular features, structures, or elements can be furthermore combined in any adequate way in one or more embodiments.

Within the scope of the present description, the word "drones" include different forms of unmanned flying targets including unmanned aerial vehicles, drones with propellers affixed at different locations on the drones.

Within the scope of the present description, the words "coupling", "connecting", "coupled", "coupling", "connections", "bolted", "laid", "positioned", "attached", "attaching", "affixed", "affixing" are used to mean attaching between two described members using screws, nails, tongs, prongs, clips, spikes, staples, pins, male and female nuts, buttons, sleeves, lugs, cams, handles, bars, fasteners, connectors, 3D gimbals, or the likes.

Within the scope of the present description, the words "remote control", "remote controlling" are used to mean wired and/or wireless controlling. Wired connections include electrically conducting wires, cables, lines, coaxial cables, strips, or the likes. Conducting wires are made of conductors such as coppers, aluminum, gold, or the likes. Wireless connections include electromagnetic waves, short range communication channels include ZigBee™/IEEE 802.15.4, Bluetooth™, Z-wave, NFC, Wi-fi/802.11, cellular (e.g., GSM, GPRS, WCDMA, HSPA, and LTE, 5G, etc.), IEEE 802.15.4, IEEE 802.22, ISA100a, wireless USB, and Infrared (IR), LoRa devices, etc. Medium range wireless communication channels in this embodiment of communication link 161 include Wi-fi and Hotspot. Long range wireless communication channels include UHF/VHF radio frequencies.

Within the scope of the present description, the word "network" includes data center, cloud network, or network such as nano network, body area network (BAN), personal area network (PAN), local area network (LAN), campus/corporate area network (CAN), metropolitan area network (MAN), wide area network (WAN), and mesh area networks, or any combinations thereof.

Within the scope of the present description, the word "rotation", "rotating", "rotate" includes clockwise and/or counterclockwise direction.

Within the scope of the present invention, the Cartesian XYZ coordinate (x,y,z) also includes equivalent spherical coordinate (r, θ, φ), and/or cylindrical coordinate (r, θ, z) that can determine the directions of movements or coordinates of the enemy's targets including GPS coordinates.

Within the scope of the present description, the word targets refer to the enemy's tanks, armored vehicles, military transportation means, trucks, ships, troops, bunkers, buildings, tents, airports, and aircrafts on the ground, the enemy's ground missile launchers, or the likes.

Within the scope of the present description, the word payloads refer to RGB cameras, heat sensors, infrared sensors, light-emitting depth cameras, light-field cameras, event-based cameras, magnetic, olfaction, thermal sensors, dipole, Lidar, or the likes.

Within the scope of the present description, the word movable objects refer to drones, unmanned aerial vehicles (UAV), aircrafts, ground transportation, such as cars and trucks, humans, selfie-stick, or the likes.

It should be noted that throughout the specification and claims herein, when one element is said to be "coupled" or "connected to another, this does not necessarily mean that one element is fastened, secured, or otherwise attached to another element. Instead, the term "coupled" or "connected" means that one element is either connected directly or indirectly to other elements or is in mechanical or electrical communication with other elements.

Figure 2:
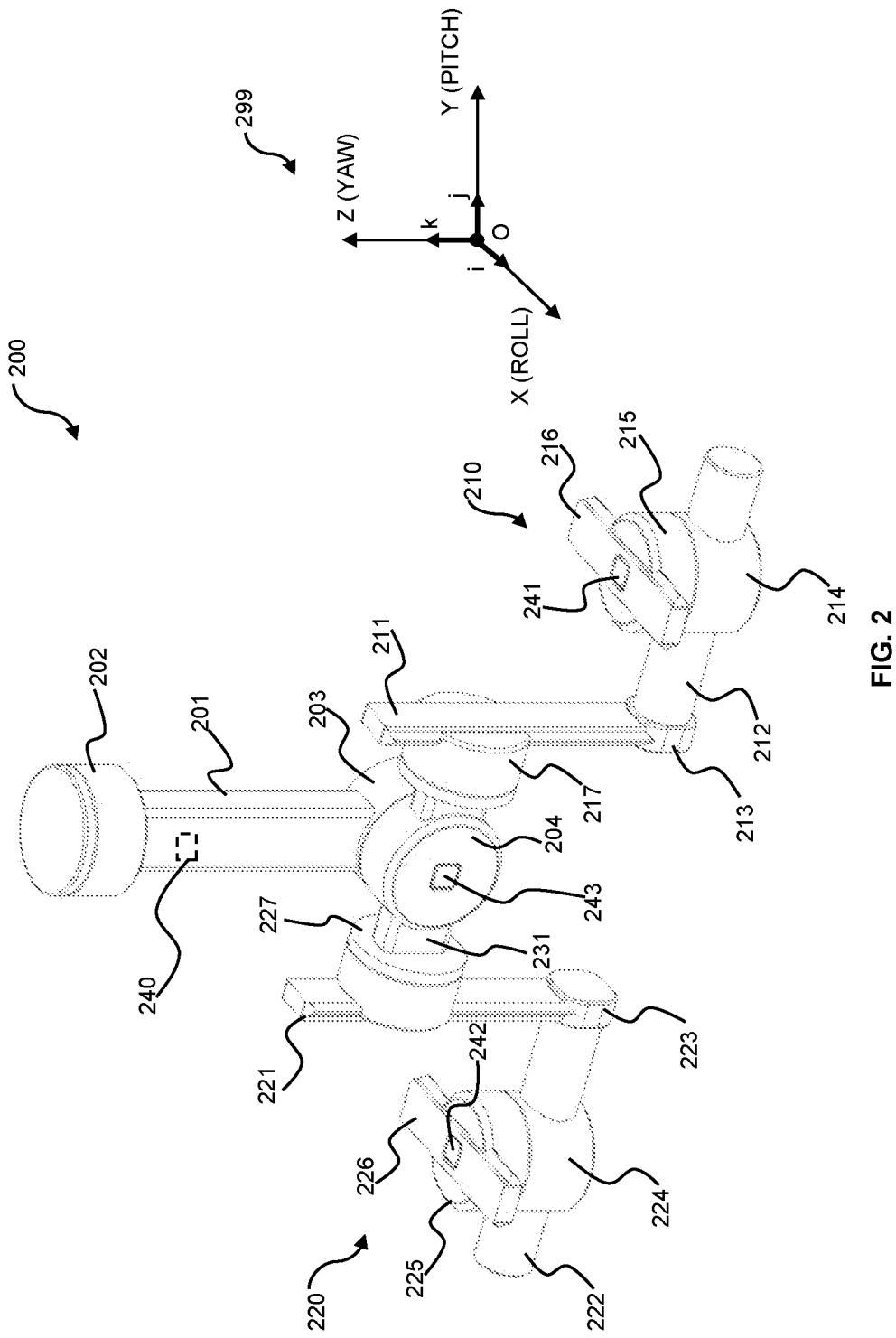
FIG. 2 is a three-dimension (3D) perspective diagram of a duo payload gimbal lock system having unrestricted spherical field of view (FOV) in accordance with an exemplary embodiment of the present invention.

Referring now to the drawings and specifically to FIG. 2, a three-dimensional (3D) perspective diagram of a dual payload spherical field of view gimbal lock 200 ("hereinafter referred to as 'gimbal lock system 200') in accordance with an exemplary embodiment of the present invention is illustrated. Gimbal 200 includes a first suspension arm 201, a second L-shaped gimbal arm 210, a third L-shaped gimbal arm 220, which are coupled together by first gimbal arm 231. A Cartesian coordinate system 299 is a reference earth coordinate system which is used to determine the positions of gimbal lock system 200 and those of targets (not shown). On one end of first gimbal arm 231, second L-shaped gimbal arm 210 further includes a first section 211 and a second section 212 connected at a 90 degree angle by a first joint 213 to form an L-shaped crankshaft (arm). On the other end, third L-shaped gimbal arm 220 further includes a third section 221 and a fourth section 222 connected at a 90 degree angle by a second joint 223 to form another L-shaped crankshaft (arm). In Cartesian coordinate system 299, suspension arm 201 is parallel to the Z (yaw) axis. First gimbal arm 231 is parallel to the Y (pitch) axis. Second L-shaped gimbal arm 210 also includes a first position adjustable pot connector 214 adjustably connected to third section 212.

Connected on top of first position adjustable pot connector 214 is a first yaw rotor 215. First yaw rotor 215 is designed to couple to first payload support 216 where a first payload (not shown, please refer to FIG. 3) is firmly mounted. Similarly, third L-shaped gimbal arm 220 also includes a second position adjustment pot connector 224 adjustably connected to fourth section 222. Connected on top of second position adjustment pot connector 224 is a second yaw rotor 225. Second yaw rotor 225 is designed to couple to second payload support 226 where a payload (not shown, please refer to FIG. 3) is firmly mounted. In many embodiments of the present invention, first position adjustment pot connector 214 and second position adjustment pot connector 224 each has a hollow cylindrical housing and a through hole pierced both lateral sides. In the bottom of this cylindrical housing a ball lock or a screw is used to secure the position of the payload in place. First and second adjustment locks 214 and 224 may also use other adjustment screws that use locking mechanisms such as ball lock, or screw lock to firmly lock first and second position adjustment pot connectors 214 and 224 to third section 212 and fourth section 222 respectively.

Continuing with FIG. 2, the top of suspension arm 201 there is a first pot screw 202 which is used to couple gimbal 200 to a movable object. The base of suspension arm 201 is connected to a third position adjustment pot connector 203 which is directly connected to a first roll rotor 204. First gimbal arm 231 is connected to a first pitch rotor 217 which is, in turn, connected to first section 211. Similarly, the left hand side of first gimbal 231 is connected to second pitch rotor 227 which is, in turn, connected to third section 221. Thus, gimbal lock system 200 includes first yaw rotor 215, first pitch rotor 217, second yaw rotor 225, second pitch rotor 227, and first roll rotor 204. These rotors are DC brushless rotors that are high-speed rotor that output large gyroscopic forces. These rotors 204, 215, 217, 225, and 227 include rotor controllers and other supporting circuits such as batteries, torque amplification devices such as the K3NG rotors. These rotors 215, 217, 225, 227, and 204 output rotational torques proportional to the input voltages they receive. When first payload (not shown, please refer to FIG. 3) is connected to first payload support 216, first payload is table turned 360° around the z-axis by first yaw motor 215, pitched 360° around the y-axis by first pitch motor 217, rolled 360° around the x-axis by first roll rotor 204. Similarly, when second payload (not shown, please refer to FIG. 3) is connected to second payload support 226, second payload is table turned 360° around the z-axis by second yaw motor 225, pitched 360° around the y-axis by second pitch motor 227, rolled 360° around the x-axis by first roll motor 204.

Continuing with FIG. 2, a first IMU 241 is installed inside first payload support 216 for measurement the amount of rotational angle of first payload. A second IMU 242 is installed inside second payload support 226 while a third IMU 243 is installed in first gimbal arm 231. Other types of sensors such as GPS/IMU and GPS/Inertia Navigation System (INS) may be placed on gimbal lock system 200 to assist in the stabilizing operations. IMU 241, 242, and 243 are devices that measure the three-axis attitude angle (or angular velocity) and acceleration of an object. Generally; an IMU contains three single-axis accelerometers and three single-axis gyros. The accelerometers detect the acceleration signals of payloads (not shown, please refer to FIG. 3) in a North East Down NED coordinate system 299 independent of gimbal lock system 200. The gyros detect the angular velocity signals of the carrier relative to the navigation coordinate system, measure the angular velocity and acceleration of n object in three-dimensional space, and solve the attitude of the object. IMUS 241, 242, and 243 are well known in the art and need not to be described in details in the present invention. IMUS can be purchased from manufacturers such as ADI (Part Number ADIS16480BMLZ), Bosch (Part Number BMI160), STMcroelectronics, (Part Number LSM9DS1TR), TDI InvenSense (Part Number IAM-20680), and Murata (Part Number 50C2230-D08-05).

Continuing again with FIG. 2, an earth-bound reference Cartesian coordinate system 299 is a fixed NED reference system used in the present invention to keep track of the positions of the moving targets (not shown) when gimbal 200 is moved with a movable object. NED reference coordinate system 299 includes an x-axis also known within the related art as the roll axis, a y-axis known as the pitch axis, and a z-axis known as the yaw axis. The x-axis has a unit vector $\vec{i}$, the y-axis has a $\vec{j}$ unit vector, and the z-axis has a $\vec{k}$ unit vector. First IMU 241 measures the angles of the center of mass of first L-shaped gimbal arm 210 with respect to a local Cartesian coordinate system (not shown). Second IMU 242 measures the angles of the center of mass of second L-shaped gimbal arm 220 with respect to a local Cartesian coordinate system (not shown). Third IMU 243 measures the roll angles of the center of masses of suspension arm 201, first gimbal arm 231, second L-shaped gimbal arm 210, and third L-shaped gimbal arm 220. A controller circuit 240 receives all inputs from first, second, third IMUs 241-243 and other sensors to measure error signals. Then the error signals are used to dynamically adjust payloads to track the targets and/or to avoid unwanted lock conditions. The angle information are translated to NED reference coordinate system 299 in order to dynamically adjust gimbal lock system 200 to achieve payload spatial positioning that is capable of tracking multiple of targets (not shown).

Figure 3:
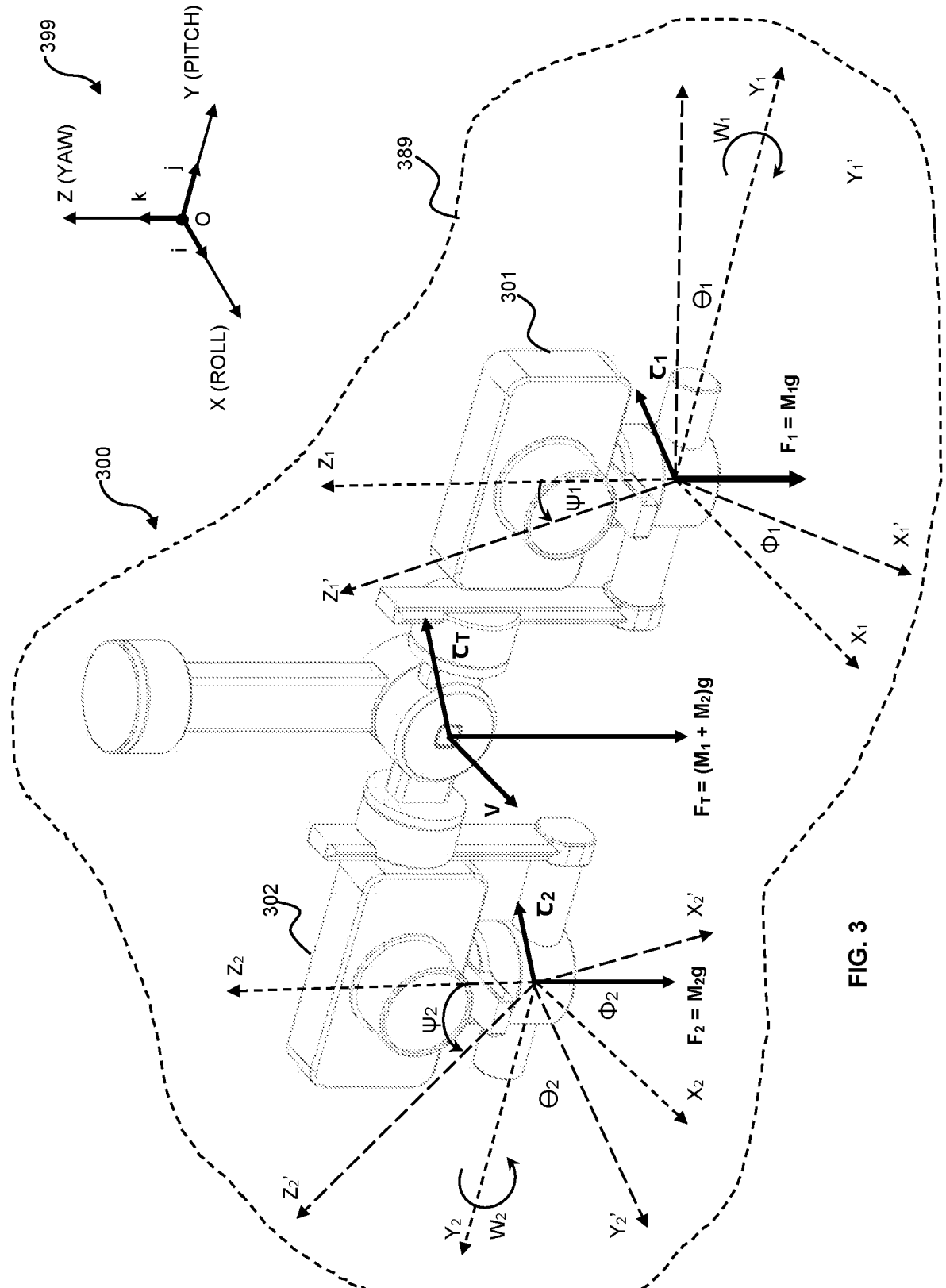
FIG. 3 is vector kinematic analyses of a gimbal lock system equipped with dual camera payloads in accordance with an exemplary aspect of the present invention.

Next referring to FIG. 3, a perspective diagram illustrating the external force analyses of gimbal lock system 300 equipped with dual payloads in accordance with an exemplary embodiment of the present invention is shown. Gimbal lock system 200 is equipped with a first payload 301 secured on first payload support 214 and a second payload 302 on second payload support 224. To illustrate the working principle of gimbal lock system 300 of the present invention, assume gimbal lock system 300 is moving forward with a velocity V. First roll rotor 204, first yaw rotor 216, first pitch rotor 217, second pitch rotor 227, and second yaw rotor 226 are freely rotated with respect to a reference Cartesian coordinate 399 which is an earth bound NED Cartesian Coordinate System. First payload 301 and second L-shaped gimbal arm 210 have a total mass $M_1$, second payload 302 and second L-shaped gimbal arm 220 have a total mass $M_2$, and suspension arm 201 has a mass $M_0$. First roll rotor 204, first yaw rotor 215, first pitch rotor 217, second pitch rotor 227, and second yaw rotor 225 are freely rotated with respect to a reference Cartesian coordinate 399 that causes first payload 301 rotates at Euler angles $\phi 1$, $\theta 1$ and $\psi 1$ with respect to a first local reference coordinate $X_1Y_1Z_1$. At the same time, second payload 302 rotates at Euler angles $\phi 2$, $\theta 2$, and $\psi 2$ with respect to a first local reference coordinate $X_2Y_2Z_2$.

Continuing with FIG. 3, a total gravity force $Fg=(M_0+M_1+M_2)g$ exists at the center of gravity of gimbal lock system 300. As the whole gimbal lock system 300 rotates, a total torque $\tau_T$ exists comprising a drag force $F_d$ due to the velocity V, forces due to the rotations of first roll rotor 204, first yaw rotor 215, first pitch rotor 217, second pitch rotor 227, second yaw rotor 22, first payload 301, and second payload 302. Alternatively, first payload 301 is experienced a gravitational force $F_1=M_1g$ and a torque $\tau 1$ composed of rotation of first motor 202, second motor 204, and second payload 302. Similarly, second payload 302 is experienced a gravitational force $F_2=M_2g$ and a torque $\tau_2$ composed of rotation of first motor 202, second motor 204, and first payload 301.

$$\begin{bmatrix} \cos\psi 1 & -\sin\psi 1 & 0 \\ \sin\psi 1 & \cos\psi 1 & 0 \\ 0 & 0 & 1 \end{bmatrix}$$

Together, when all three arbitrary rotations happen at the same time in the XYZ axis can be represented by multiplying the above rotation matrices together to obtain the total rotation matrix:

$$\begin{bmatrix} \cos\Phi 1\cos\theta 1\cos\psi 1 - \sin\Phi 1\sin\psi 1 & -\cos\psi 1\sin\Phi 1 - \cos\Phi 1\cos\theta 1\sin\psi 1 & \cos\Phi 1\sin\theta 1 \\ \cos\theta 1\cos\psi 1\sin\Phi 1 - \cos\Phi 1\sin\psi 1 & \cos\psi 1\cos\psi 1 - \cos\theta 1\sin\Phi 1\sin\psi 1 & \sin\Phi 1\sin\theta 1 \\ -\cos\psi 1\sin\theta 1 & \sin\theta 1\sin\psi 1 & \cos\theta 1 \end{bmatrix}$$

These forces $F_T$, $F_1$, $F_2$, $\tau_T$, $\tau_1$, $\tau_2$ tend to cause gimbal lock system 300 to deviate by an error Euler angle amounts of ($\Delta\phi_1$, $\Delta\theta_1$, and $\Delta\psi_1$) in first payload 301 and ($\Delta\phi_2$, $\Delta\theta_2$, and $\Delta\psi_2$) in second payload 302. The actual rotation angle for first payload 301 is by Euler angle ($\phi_1+\Delta\phi_1$, $\theta_1+\Delta\theta_1$, and $\psi_1+\Delta\psi_1$). The actual rotation angle for second payload 302 is by Euler angle ($\phi_2+\Delta\phi_2$, $\theta_2+\Delta\theta_2$, and $\psi_2+\Delta\psi_2$). These Euler angle errors can be calculated by multiplying the preset rotation matrix with the inverse of the actual rotation matrix.

In practice, controller circuit 240 on board of gimbal lock system 300 with sensors are used to measure the Euler angle differences between the actual and the preset angles. Then, these errors in Euler angles are converted to voltages which are used to adjust the rotation of first payload 301 and second payload 302. It is noted that high frequency vibrations affecting gimbal 300 are not considered within the present invention but they can be significantly dampened using 3D printed anti-vibration platform, O-ring suspension mount, ear plug mount, and bulb damper. These types of anti-vibrational dampeners can eliminates high-frequency vibrations. Other errors caused by moving targets can be corrected by phase interferometry method or direction finding (DF) techniques by the movable object which is equipped with gimbal lock system 300. Therefore, rotational errors caused by the movements of the targets are not considered herewith. Another type of errors include the centrifugal forces caused rotor imbalance can be cured by calibration procedure before use.

Continuing with FIG. 3, a rotation around a single x-axis of first payload 301 by an Euler angle $\phi_1$ is represented by a rotation matrix:

$$\begin{bmatrix} 1 & 0 & 0 \\ 0 & \cos\Phi 1 & -\sin\Phi 1 \\ 0 & \sin\Phi 1 & \cos\Phi 1 \end{bmatrix}$$

The rotation around y-axis of first payload 301 by an Euler angle $\theta_1$ is represented by a rotation matrix:

$$\begin{bmatrix} \cos\theta 1 & 0 & \sin\theta 1 \\ 0 & 1 & 0 \\ -\sin\theta 1 & 0 & \cos\theta 1 \end{bmatrix}$$

The rotation around the z-axis of first payload 301 by an Euler angle $\psi_1$ is represented by a rotation matrix:

Let this total rotation matrix around XYZ axis be represented by $R_T(\phi_1,\theta_1,\psi_1)$. When an error occurs due to the external forces discussed above, the actual total rotation matrix is denoted as $\widehat{R_T}(\phi_1+\Delta\phi_1, \theta_1+\Delta\theta_1, \text{ and } \psi_1+\Delta\psi_1)$ obtained by measuring the actual total rotation using first, second, and third IMUS 241, 242, 243. The error in Euler angles $R_e=R_T\widehat{R^*}_T$, where $R_e=(\Delta\phi_1, \Delta\theta_1, \Delta\psi_1)$ and $\widehat{R^*}_T$ is the transpose of $\widehat{R_T}(\phi_1+\Delta\phi_1, \theta_1+\Delta\theta_1, \omega_1+\Delta\omega_1)$. The Euler angle differences or errors $R_e$ are converted to voltages and controller circuit 420 uses these voltages as correcting signals to re-orient first payload 301.

Continuing with FIG. 3, in terms of quaternion, let $$Q_1 = \left(w_1, \vec{r_1}\right)$$

be the quaternion transformation of the total rotation of the $R_T(\phi_1,\theta_1,\psi_1)$ above and $\widehat{Q_2}=(w_2,\vec{r_2})$ be the quaternion transformation of the total actual rotation matrix $\widehat{R_T}(\phi_1+\Delta\phi_1, \theta_1+\Delta\theta_1, \psi_1+\Delta\psi_1)$. Where $$\vec{r_1}\left(a_1 \vec{i} + b_1 \vec{j} + c_1 \vec{k}\right) \text{ and } \vec{r_2}\left(a_2 \vec{i} + b_2 \vec{j} + c_2 \vec{k}\right).$$

The errors between two quaternions can be detected using first, second, and third IMU 241, 242, and 243 and/or other sensors such as GPS. Then, these error signals can be computed by $$Q_e = \widehat{Q_2}^{-1} \times Q_1,$$

where $Q_e$ is the error quaternion and $\widehat{Q_2}^{-1}$ is the inverse of the actual rotation quaternion. Then $Q_e$ is converted into correcting voltages transmitted to the first to controller circuit 420 in order to position first payload 301 and second payload 302. The correction positions include tracking positions of targets or free rotating payloads without losing any degrees of freedom (DOF). In the earlier situation, the movable object may move in a first direction while first payload 301 and second payload 302 are independently tracking the targets. In latter situation, the movable object may lock into the targets while first payload 301 and second payload 302 are free to rotate without being locked up to wrong positions.

It is noted that either Euler matrices or quaternion methods described above are mutable. That is, the Euler matrices can be converted to quaternion method and vice versa. Furthermore, the analyses of second payload 302 are the same as those of first payload 301 above. That is, (1) measuring all forces that affect second payload 302; (2) measuring the actual angles affected by these forces; (3) measuring the errors between preset angles and the actual angles; (4) Using the errors to re-position second payload 302.

Next, referring to FIG. 4A-FIG. 4D, perspective diagrams illustrating different orientations of the payloads of the gimbal of the present invention are presented. A diagram 400A is an exemplary orientation of gimbal lock system 300 in which first payloads 301 and second payload 302 point at opposite directions around the z-axis (yaw) while the roll and pitch are zero: ($\phi_1$=0, $\theta_1$=0, $\psi_1$=90°) and ($\phi_2$=0, $\theta_2$=0, and $\psi_2$=90°). A diagram 400B is an exemplary orientation of gimbal lock system 300 in which first payloads 301 and second payload 302 point at opposite directions around the y-axis (pitch) while the Euler rotations around the yaw and roll are zero: ($\phi_1$=0, $\theta_1$=90°, $\psi_1$=0) and ($\theta_2$=0, $\theta_2$=−90°, $\psi_2$=0). A diagram 400C is an exemplary orientation of gimbal lock system 300 in which first payloads 301 is pitched around the y-axis at an Euler angle of $\theta_1$=30° ($\phi_1$=0, $\theta_1$=30°, $\psi_1$=0) while second payload 302 is pitched at an Euler angle $\theta_2$ ($\phi_2$=0, $\theta_2$=30°, $\psi_2$=0) and then yawed at an Euler angle $\psi_2$ ($\phi_2$=0, $\theta_2$=0°, $\psi_2$=180°). Finally in a diagram 400D, first payload 301 is rotated around a z-axis at an Euler angle $\psi$1 ($\phi_1$=0, $\theta_1$=0, $\psi_1$=45°) while second payload is rotated around the z-axis at an Euler angle ($\phi_2$=0, $\theta_2$=0, $\psi_2$=45°). FIG. 4A-FIG. 4D illustrate the independent and unrestricted spherical field of view capability of each payload 301 and 302. Thus, from the mechanical aspect, gimbal lock system 300 of the present invention allows first payload 301 and second payload 302 to independently cover a complete 360° field of view without any restrictions and/or blockades.

Figure 5:
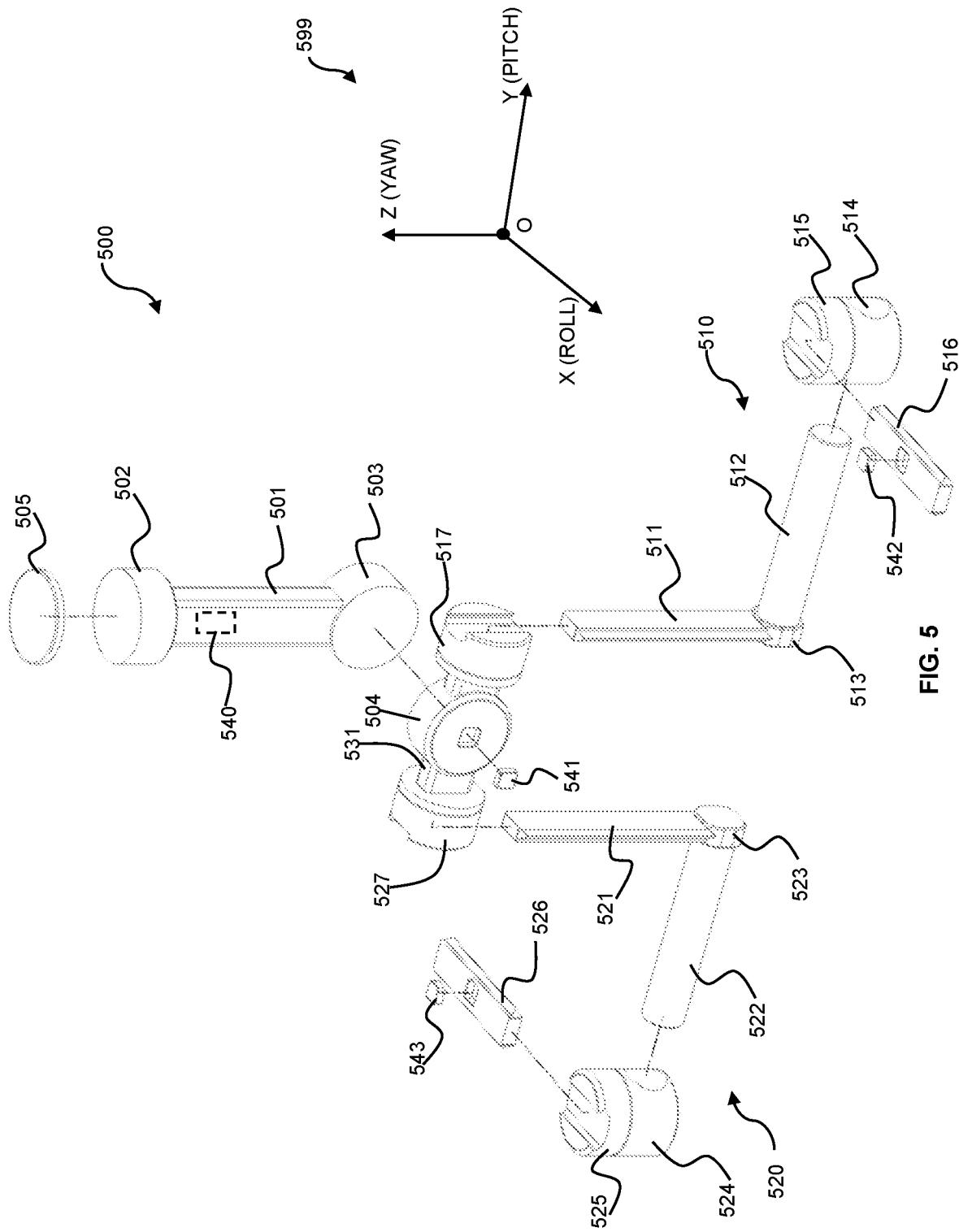
FIG. 5 is an assembly diagram of the dual payload gimbal lock system in accordance with an exemplary aspect of the present invention.

Next referring to FIG. 5, an assembly diagram 500 showing the manner gimbal lock system 200 and gimbal lock system 300 of the present are assembled and manufactured in accordance with an exemplary embodiment of the present invention is illustrated. A suspension frame 501 is oriented along a z-direction and has a top end connected to a first connector 502 and bottom terminal adjustably connected to a first length adjustment tube connector 503. First position adjustment tube connector 503 connects to a first roll rotor 504 which is coupled to a first gimbal arm 504. The position of first roll rotor 504 can be adjusted along first gimbal arm 531. First roll rotor 531 houses a first IMU 542 and while suspension arm 501 houses a controller circuit 540. At the two ends of first gimbal arm 504, a first pitch motor 517 is affixed and connected to a third adjustable tube connector 513 via a second L-shaped gimbal arm 510. On the other opposite side, a second pitch motor 527 is affixed and connected to a fourth adjustable tube connector 524 via a third L-shaped gimbal arm 520. Second L-shaped gimbal arm 510 is coupled to second position adjustment tube connector 514. Second L-shaped gimbal arm 510 consists of a first section 511 and a second arm 512 connected together by a first joint 513 to form an L-shape arm or crankshaft. A first yaw motor 515 is deposited directly on top of second position adjustment tube connector 514. Second position adjustment tube connector 514 couples to a first payload support 516 which is used to secure a first payload (not shown, please see FIG. 3). A second IMU 542 is placed inside first payload support 516. In the same manner, on the other side of first gimbal arm 511, third L-shaped gimbal arm 520 is coupled to third position adjustment tube connector 524. Third L-shaped gimbal arm 520 consists of a third section 521 and a fourth section 522 connected together by a second joint 523 to form an L-shape arm or crankshaft. A second yaw motor 525 is deposited directly on top of a third position adjustment connector 534. Third position adjustment tube connector 524 includes a second payload support 526 which is used to secure a second payload (not shown, please see FIG. 3). A third IMU 543 is placed inside second payload support 526.

Figure 6:
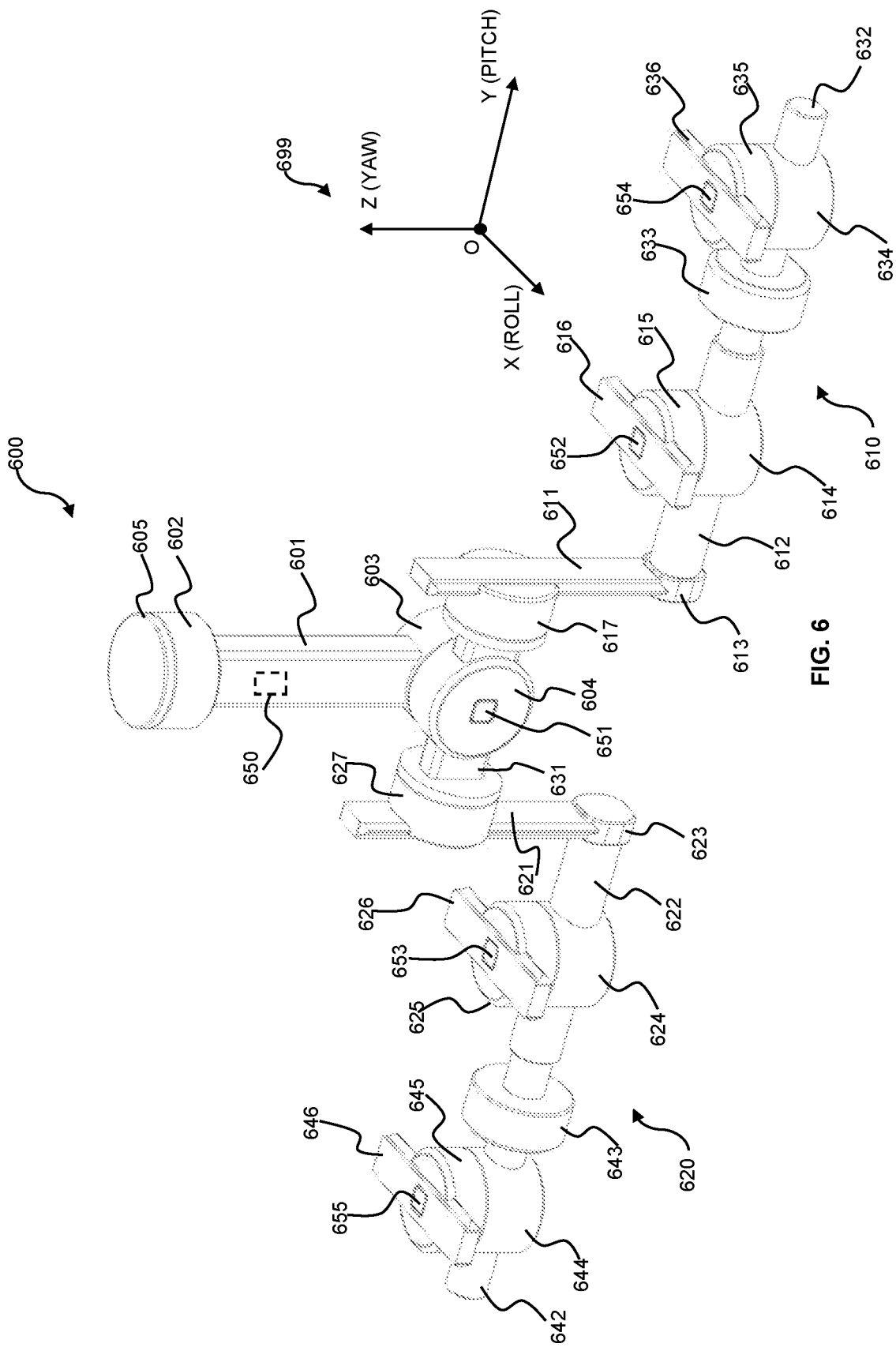
FIG. 6 is a quad-cameras version of the gimbal lock system having extendable telescoping L-shaped gimbal arms in accordance with an exemplary embodiment of the present invention.

Next, referring to FIG. 6, a three-dimension (3D) diagram of a quad-payload spherical field of view gimbal lock system 600 (quad gimbal lock system 600) in accordance with an exemplary embodiment of the present invention is illustrated. Quad gimbal lock system 600 is analogous to gimbal lock system 200 described above. A suspension frame 601 is oriented along a z-direction and has a top end connected to a first connector 602 and bottom terminal adjustably connected to a first length adjustment tube connector 603. First position adjustment tube connector 603 connects to a first roll rotor 604 which is coupled to a first gimbal arm 631. The position of first roll rotor 604 can be adjusted along first gimbal arm 631. First roll rotor 604 houses a first IMU 651 and while suspension arm 601 houses a controller circuit 650. At the two ends of first gimbal arm 631, a first pitch motor 617 is affixed and connected to a third adjustable tube connector 613 via a second extendable telescoping L-shaped gimbal arm 610. On the other opposite side, a second pitch motor 627 is affixed and connected to a fourth adjustable tube connector 624 via a third extendable telescoping L-shaped gimbal arm 620. Second extendable telescoping L-shaped gimbal arm 610 is coupled to second position adjustment tube connector 614. Second extendable telescoping L-shaped gimbal arm 610 consists of a first section 611 and a second arm 612 connected together by a first joint 613 to form an L-shape arm or crankshaft. A first yaw motor 615 is deposited directly on top of second position adjustment tube connector 614. Second position adjustment tube connector 614 couples to a first payload support 616 which is used to secure a first payload (not shown, please see FIG. 3). A second IMU 652 is placed inside first payload support 616. In the same manner, on the other side of first gimbal arm 631, third extendable telescoping L-shaped gimbal arm 620 is coupled to third position adjustment tube connector. Third L-shaped gimbal arm 620 consists of a third section 621 and a fourth section 622 connected together by a second joint 623 to form an L-shape arm or crankshaft. A second yaw motor 625 is deposited directly on top of a third position adjustment connector 634. Third position adjustment tube connector 624 includes a second payload support 626 which is used to secure a second payload (not shown, please see FIG. 3). A third IMU 653 is placed inside second payload support 626.

Continuing with FIG. 6, except that second section 612 of second extendable telescoping L-shape gimbal arm 610 of quad gimbal lock system 600 is extended to a fourth gimbal arm 632 that includes a third pitch motor 633 and a fourth position adjustment tube connector 634. Fourth position adjustment tube connector 634 supports a third yaw motor 635 where a third payload support 636 is firmly secured. A fourth IMU 654 is stored to measure the rotation angles of a third payload (not shown). Similarly, in third extendable telescoping L-shape gimbal arm 620 of quad gimbal lock system 600 is extended to a fifth gimbal arm 642 that includes a fourth pitch motor 643 and a fifth position adjustment tube connector 644. Fifth position adjustment tube connector 644 supports a fourth yaw motor 645 where a fourth payload support 646 is firmly secured. A fifth IMU 655 is stored to measure the rotation angles of a fourth payload (not shown). It is noted that any gimbal system including more than two payloads structured and operated in the same manner discussed above are within the scope and obvious variations of the present invention.

Figure 7:
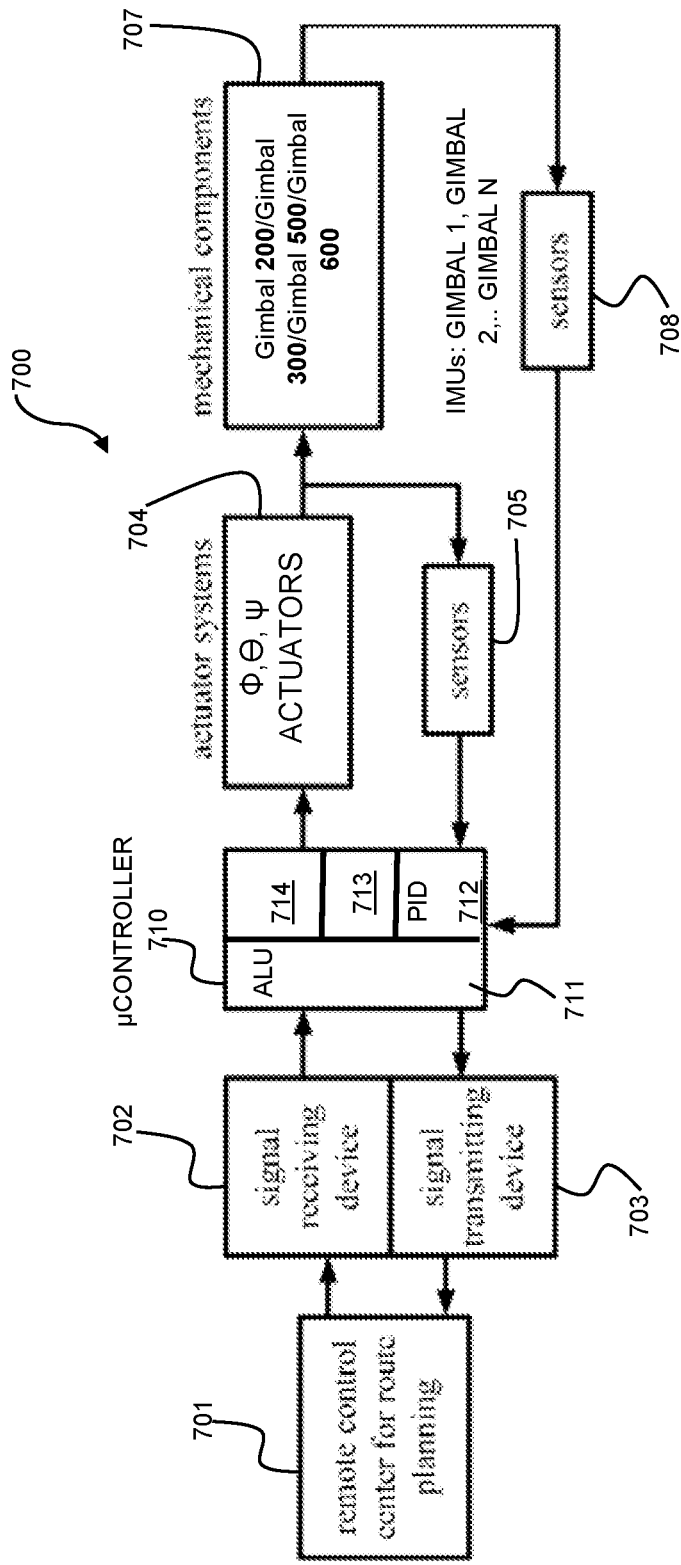
FIG. 7 is a schematic diagram of the gimbal servo system in accordance with an exemplary embodiment of the present invention.

Next referring to FIG. 7, a block diagram of a gimbal electrical system 700 used conjunction with the-gimbal system of the present invention is shown. Basically, gimbal electrical system 700 receives information from the IMUs, GPS, input signals, feedback signals, and other sensor signals to calculate the error signals as described in FIG. 3. Correcting signals are calculated to direct first payload 301 and second payload 302 to aim at the desired directions. The desired directions include either (a) full degrees of freedom (e.g., avoidance of lock position and having the movable object to lock onto the targets) or (b) the payloads track the targets. To achieve this objective, gimbal electrical system 700 includes a command and control center (C&C center) 701, transceivers 702-703, a microcontroller 710, actuators 704, rotor feedback sensors 705, a gimbal mechanical structure 707 ("gimbal frame 707"), and IMU sensors 708. It is noted that gimbal mechanical structure 707 is the same as the structures of gimbal lock system 200, gimbal lock system 300, and gimbal lock system 600 described in detailed above. Their mechanical structures and assemblies are described in FIG. 2-FIG. 5.

More particularly, C&C center 701 is a remote controller, a reference base station, or a soldier who sends wireless input signals to gimbal lock system 200 or gimbal lock system 600. These wireless input signals may include GPS locations of the targets and reference coordinates of the north east and down (NED) fixed reference coordinate system. Transceivers 702-703 includes a receiver 702 and a transmitter 703. Receiver 702 receives the wireless input signals from reference C&C center 701. Transceiver 703 sends various signals such as Euler angle information ($\phi_1$, $\theta_1$, $\psi_1$), quaternion transformation signals, and GPS/INS signals. Microcontroller 711 includes algorithms and Arithmetic Logic Unit (ALU) 711 to calculate displacement error signals caused by the external forces. Then, microcontroller 711 outputs control currents therefrom. A proportional, integral, and derivative (PID) circuit 712 is a servo control unit configured to control the speed and position of each IMU and the other operational aspects of gimbal 200 or gimbal 600. PID servo control unit 711 receives a reference position together with the actual angular, linear speed velocities, and positions from gimbal frame 707. Then, PID servo control unit 711 dynamically adjusts the velocities and positions so that the error signals are zero. A simultaneous localization and mapping (SLAM) unit 713 uses the sensor data to estimate the current position of gimbal frame 707. These signals are important to measure the error signals. A motor controller and hardware driver unit 714 receive controlling signals derived from the error signals. Actuator systems 704 include all the motors listed above in FIG. 3. Rotor feedback sensors 705 return the output signals of all rotors. Next, gimbal frame 707 includes all mechanical parts such as suspension frame 201, first gimbal arm 231, second L-shaped gimbal arm 210, and third L-shaped gimbal arm 220. IMUs 708 include first IMU 241, second IMU 242, and third IMU 243. Microcontroller 710 is controller circuits 240, 540, and 650.

Figure 8:
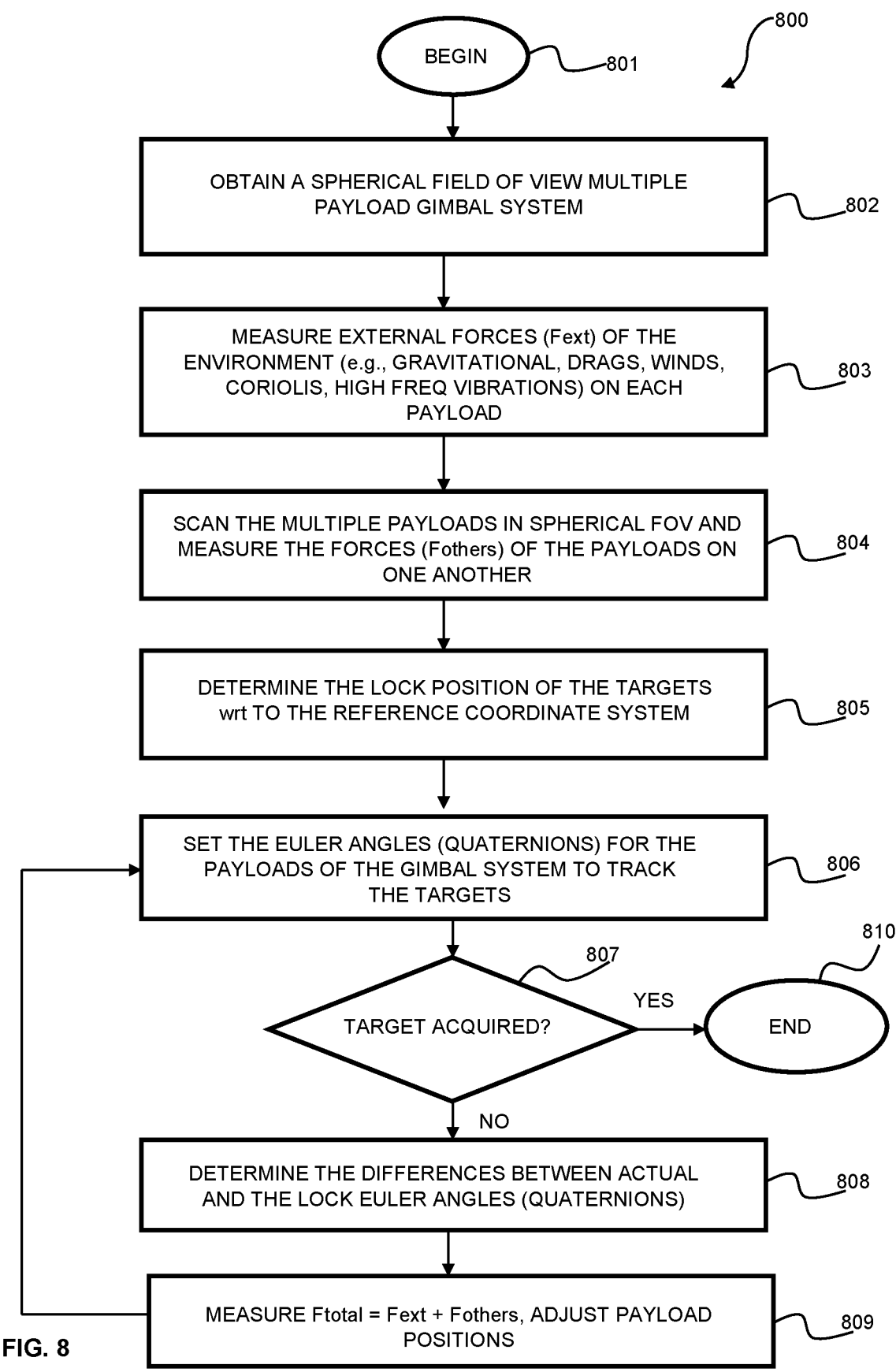
FIG. 8 illustrates a flow chart of a method of operating a gimbal lock system in accordance with an exemplary embodiment of the present invention.

Finally referring to FIG. 8, a method 800 of achieving spherical field of view gimbal lock action in accordance with an exemplary embodiment of the present invention is illustrated.

At step 801, method 800 begins by gathering all components of the spherical field of view (FOV) gimbal of the present invention. The components of gimbal include mechanical components, software components, and electrical components. Mechanical components include suspension arm 201, first connector 202, first position adjustment tube connector 203, first gimbal arm 231, second position adjustment tube connector 217, second L-shaped gimbal arm 210, third position adjustment tube connector 214, first payload support 216, second payload support 226, and fourth position adjustment tube connector 224. Software components include any software programming language that can perform the feedback control operations described in FIG. 3 and FIG. 7 above. In some aspects of the present invention, software components may include self-development kit (SDK) software, Adruino, Mathlab, or C++. Electrical components include a first IMU 241, microcontroller 240, roll rotor 204, first pitch rotor 504, first yaw rotor 215, second pitch motor 227, second yaw rotor 225, second IMU 242, and third IMU 243. Other electrical components include remote controller 701, transceiver 702-703, microcontroller 710, ALU 711, PID 712, AGPS/INS system, SLAM 713, and rotor controllers 714.

Next, at step 802, the gimbal frame is obtained. The implementation of step 802 is realized by assembling gimbal lock system 200 as shown in FIG. 5 using all components of step 801. Gimbal frame is the mechanical parts of gimbal lock system 200 described in FIG. 2 and FIG. 5 above. Because of the novel structure of gimbal frame (i.e., gimbal 200), the spherical field of view (FOV) is achieved.

At step 803 all the external forces are calculated during the operations of the spherical FOV gimbal. These external forces include $F_T$, $F_1$, $F_2$, $\tau_T$, $\tau_{21}$ $\tau_2$. The total gravity force $Fg=(M_0+M_1+M_2)g$ exists at the center of gravity of gimbal 200. As the whole gimbal 200 rotates, a total torque $\tau_T$ exists composed of a drag force due to the velocity V, centrifugal forces due to the Euler rotation of roll rotor 202, first pitch rotor 217, first yaw rotor 215, second pitch rotor 227, and second yaw rotor 225, first payload 301, and second payload 302. Other external forces include Coriolis force, high frequency vibrations, etc. These forces can be measured by sensors and IDs described above.

At step 804, during the operations of the spherical field of view gimbal, when one gimbal rotates, it exerts a torque on the other gimbals. In fact; when first payload 301 rotates arbitrarily in 3D, it exerts a torque on second payload 302 and vice versa. These external torques cause the Euler rotations in 3D of second gimbal 302 to be deviated, causing errors or loss of DOF. Particularly, first payload 301 is experienced a gravitational force $F_1=M_1g$ and an external torque τ1 composed of the Euler 3D rotations of roll rotor 204, second pitch rotor 227, second yaw rotor 225, and second payload 302. Similarly, second payload 302 is experienced a gravitational force $F_2=M_2g$ and a torque $\tau_2$ composed of rotation of roll rotor 204, first pitch rotor 217, first yaw rotor 215, and first payload 301.

At step 805, tracking positions of the targets are acquired. Gimbal 200 can lock at two different targets simultaneously because first payload 301 and second payload 302 can operate independently. The positions of the targets can be obtained by OPS, Lidar carried on the movable object that carries gimbal lock system 200. The positions of the targets are expressed in terms of Cartesian coordinates such as the NED coordinates 399 and changing coordinate system $X_1Y_1Z_1$ and $X_2Y_2Z_2$ of the changing frame of reference 389. These frame of references 389 and 399 can be transformed using Euclidean transformation or quaternion transformations.

At step 806, the errors in angles are converted into input voltages that rotate the motors within between spherical field of view gimbals. Step 806 is realized by using actuators 704 to rotate first payload 301 and/or second payload 302. The voltage conversion from error in Euler angles $R_e = R_T \widehat{R^*}_T$, where $R_e = (\Delta\phi_1, \Delta\theta_1, \Delta\psi_1)$ and $\widehat{R^*}_T$ is the transpose of $\widehat{R_T}$ ($\phi_1+\Delta\phi_1$, $\theta_1+\Delta\theta_1$, and $\psi_1+\Delta\psi_1$). Alternatively, quaternion calculation of angle error can also be used $$Q_{e=\overline{\omega}_1}^{-1} \times Q_1.$$

At step 807, whether the targets are fully acquired and tracked are determined. Step 807 is realized by transmitting the images of the targets back to remote controller 701 using signal transmitting device 703. Other methods may include microcontroller 710 and the feedback control mechanism to measure the angle errors which are the difference between the actual angles and the set angles by the GPS or by determining the loss of degree of freedom (DOF).

At step 808, if the positions of the targets are not the same, then the rotational differences are determined Step 808 is realized by PID feedback control unit 712 and SLAM unit 713 to obtain correcting voltages to adjust actuator 704 to achieve the correct rotational positions of first payload 301 and second payload 302.

At step 809, the external forces ($F_T$, $F_1$, $F_2$, $\tau_T$, $\tau_{21}$, $\tau_2$) are measured again to ensure that the positions of the payloads are changed to due to new situations that could cause new total forces which may adversely affect the stability of the aimbal. Step 809 is necessary due to the fickleness of the environment.

Steps 806 to 809 are repeated to ensure that each payload would track the targets independently and accurately.

At step 810, the targets are tracked accurately and consistently.

From the disclosure of FIG. 1 to FIG. 8 above, the following targets of the present invention are achieved:

(a) a simple mechanical structure of a gimbal that can achieve the spherical field of view (FOV) without visual restrictions.

(b) a gimbal system that can operate the spherical field of view gimbal.

(c) a method for achieving spherical field of view gimbal without any visual restrictions.

(d) a method for tracking multiple targets with full spherical field of view.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Within the scope of the present description, the reference to "an embodiment" or "the embodiment" or "some embodiments" means that a particular feature, structure or element described with reference to an embodiment is comprised in at least one embodiment of the described object. The sentences "in an embodiment" or "in the embodiment" or "in some embodiments" in the description do not therefore necessarily refer to the same embodiment or embodiments. The particular feature, structures or elements can be furthermore combined in any adequate way in one or more embodiments.

Within the scope of the present description, the words "connected", "connecting", "coupled", "coupling", "connections", "bolted", "laid", "positioned", "attached", "attaching", "affixed", "affixing" are used to mean attaching between two described members using screws, nails, tongs, prongs, clips, spikes, staples, pins, male and female nuts, buttons, sleeves, lugs, cams, handles, bars, fasteners, connectors, or the likes.

Within the scope of the present description, the words "connected", "connecting", "coupled", "coupling", "connections", are used to mean wired and/or wireless connections. Wired connections include electrically conducting wires, cables, lines, coaxial cables, strips, or the likes. Conducting wires are made of conductors such as coppers, aluminum, gold, or the likes. Wireless connections include electromagnetic waves, short range communication channels include ZigBee™/IEEE 802.15.4, Bluetooth™, Z-wave, NFC, Wi-fi/802.11, cellular (e.g., GSM, GPRS, WCDMA, HSPA, and LTE, 5G, etc.), IEEE 802.15.4, IEEE 802.22, ISA100a, wireless USB, and Infrared (IR), LoRa devices, etc. Medium range wireless communication channels in this embodiment of communication link 161 include Wi-fi and Hotspot. Long range wireless communication channels include UHF/VHF radio frequencies.

Within the scope of the present description, the word "network" includes data center, cloud network, or network such as nano network, body area network (BAN), personal area network (PAN), local area network (LAN), campus/corporate area network (CAN), metropolitan area network (MAN), wide area network (WAN), and mesh area networks, or any combinations thereof.

Within the scope of the present description, the word "rotation", "rotating", "rotate" includes clockwise and/or counterclockwise direction.

Within the scope of the present invention, the Cartesian XYZ coordinate (x,y,z) also includes equivalent spherical coordinate (r, θ, φ), and/or cylindrical coordinate (r, θ, z) that can determine the Euler angle of arbitrary rotations in 3D space.

DESCRIPTION OF NUMERALS 100 prior-art 3-axis gimbal
101 first gimbal frame
102 first position adjustment slot
103 yaw motor (or rotor)
104 first rotating ball nut
111 second gimbal frame
112 second position adjustment slot
113 roll motor
114 second rotating ball nut
120 third gimbal frame
121 bottom horizontal bar
122 vertical support
123 vertical support
124 top horizontal bar 125 height adjusting screw
126 height adjusting screw
127 pitch motor
128 pitch motor
131 yaw plane
132 roll plane
133 pitch plane
199 Cartesian Coordinate system
200 Duo payload spherical field of view gimbal
201 suspension arm
202 first connector
203 first position adjustment pot connector
204 first roll rotor
210 second L-shaped gimbal arm
211 first section
212 second section
213 first L-shape gimbal arm joint
214 second position adjustment pot connector
215 first yaw rotor
216 first payload support
217 third position adjustment pot connector
218 first pitch rotor
220 third L-shaped gimbal arm
221 third section
222 fourth section
223 second joint
224 third position adjustment pot connector
225 second yaw rotor
226 second payload support
227 fourth position adjustment pot connector
228 second pitch rotor
231 first gimbal arm
240 controller circuit board
241 first IMU
242 second IMU
243 third IMU
300 spherical field of view gimbal coupled to dual payloads
301 first payload
302 second payload
500 assembly diagram of the dual gimbal
501 suspension arm
502 first connector
503 first position adjustment pot connector
504 first roll rotor
510 second L-shaped gimbal arm
511 first section
512 second section
513 first L-shape gimbal arm joint
514 second position adjustment pot connector
515 first yaw rotor
516 first payload support
517 third position adjustment pot connector
518 first pitch rotor
520 third L-shaped gimbal arm
521 third section
522 fourth section
523 second joint
524 third position adjustment pot connector
525 second yaw rotor
526 second payload support
527 fourth position adjustment pot connector
528 second pitch rotor
531 first gimbal arm
540 controller circuit board
541 first IMU
542 second IMU
542 third IMU
599 earth reference coordinates
600 quad payload spherical field of view gimbal system
601 suspension arm
602 first connector
603 first position adjustment pot connector
604 first roll rotor
610 second extendable telescoping L-shaped gimbal arm
611 first section
612 second section
613 first L-shape gimbal arm joint
614 second position adjustment pot connector
615 first yaw rotor
616 first payload support
617 third position adjustment pot connector
618 first pitch rotor
620 third extendable telescoping L-shaped gimbal arm
621 third section
622 fourth section
623 second joint
624 third position adjustment pot connector
625 second yaw rotor
626 second payload support
627 fourth position adjustment pot connector
628 second pitch rotor
631 first gimbal arm
632 fourth gimbal arm
633 third pitch rotor
634 fourth position adjustment pot connector
635 third yaw rotor
636 third payload support
642 fifth gimbal arm
633 fourth pitch rotor
644 fifth position adjustment pot connector
645 fourth yaw rotor
646 fourth payload support
650 controller circuit board
651 first IMU
652 second IMU
653 third IMU
654 fourth IMU
655 fifth IMU
700 gimbal system
701 C&C center
702 receiver
703 transmitter
704 actuator systems (e.g., rotors)
705 actuator feedback sensors
707 gimbal frame (e.g., gimbal 200, 300, or 600)
708 IMU
710 microcontroller
711 ALU (Arithmetic Logic Unit)
712 PID (proportional, integration, derivative)
713 SLAM
714 rotor controller/drivers

What is claimed is:

1. A spherical field of view gimbal system ("gimbal system"), comprising:
 (a) a suspension arm having a first terminal and a second terminal, wherein said first terminal is connected to a transport vehicle;
 (b) a first gimbal arm connected to said second terminal of said suspension arm in a manner that allows said first gimbal arm to roll in 360°;
 (c) a second extendable telescoping L-shaped gimbal arm connected to a third terminal of said first gimbal arm in a manner that allows said extendable telescoping second L-shaped gimbal arm to pitch and yaw independently in 360°; and (d) a third extendable telescoping L-shaped gimbal arm connected to a fourth terminal of said first gimbal arm in a manner that allows said third extendable telescoping L-shaped gimbal arm to pitch and yaw independently in 360°.

2. The gimbal system of claim 1 further comprising:
(e) a plurality of rotors operable to pitch and yaw said second extendable telescoping L-shaped gimbal arm in 360° and pitch and yaw said third extendable telescoping L-shaped gimbal arm in in 360°;
(e) a plurality of sensors operable to sense rotational angles of said first second extendable telescoping L-shaped gimbal arm and said third extendable telescoping L-shaped gimbal arm; and
(f) a controller circuit, electrically coupled to said plurality of sensors, operable to cause said plurality of rotors to rotate according to predetermined angles of rotation.

3. The gimbal system of claim 2 wherein said controller circuit further comprises:
a PID circuit operable to measure error angles which are the differences between said predetermined angles of rotation and actual measured angles of rotation;
a arithmetic logic unit (ALU) operable to calculate Euler rotation matrices for said second extendable telescoping L-shaped gimbal arm and said third L-shaped extendable telescoping gimbal arm; and
a Geo Positioning System (GPS) operable to determine positions of said gimbal system with respect to a fixed frame of reference.

4. The gimbal system of claim 1 wherein said controller circuit further comprises:
a feedback control circuit; electrically coupled to said plurality of sensors, said controller circuit, and said plurality of rotors; operable to provide said error angles.

5. The gimbal system of claim 3 further comprising a plurality of feedback sensors each coupled to said plurality of rotors, operable to measure said actual measured angles of rotation.

6. The gimbal system of claim 4 wherein said plurality of sensors further comprises inertia measurement units (IMUs).

7. The gimbal system of claim 1 further comprising a transceiver circuit electrically coupled to said controller circuit.

8. The gimbal system of claim 1 wherein said first extendable telescoping L-shaped gimbal arm and said second extendable telescoping L-shaped gimbal arm each comprises:
a first section; and
a second section connected to said first section by a joint at a 90° angle; wherein said first section is coupled to said first gimbal arm.

9. The gimbal system of claim 8 wherein said second section is a telescoping tube capable of extending a length of said second section so that said first extendable telescoping L-shaped gimbal arm and said second extendable telescoping L-shaped gimbal arm is capable of supporting at least one payloads.

10. The gimbal system of claim 8 wherein said telescoping tube further comprises:
a third pitch rotor; and
a third yaw rotor.

11. The gimbal system of claim 9 wherein said third extendable telescoping L-shaped gimbal arm further comprises:
a third section; and
a fourth section connected to said third section by a second joint at a 90° angle; wherein said third section is coupled to said first gimbal arm.

12. The gimbal system of claim 11 wherein said fourth section is a second telescoping tube capable of extending a length of said fourth section.

13. The gimbal system of claim 11 wherein said second telescoping tube further comprises:
a fourth pitch rotor; and
a fourth yaw rotor.

14. A method of obtaining a spherical field of view gimbal system, comprising:
(a) preparing a gimbal structure comprising: a suspension arm having a first terminal and a second terminal, wherein said first terminal is connected to a host vehicle; a first gimbal arm connected to said second terminal of said suspension arm in a manner that allows said first gimbal arm to roll in 360°; a second extendable telescoping L-shaped gimbal arm connected to a third terminal of said first gimbal arm in a manner that allows said second extendable telescoping L-shaped gimbal arm to pitch and yaw in 360°; and a third extendable telescoping L-shaped gimbal arm connected to a fourth terminal of said first gimbal arm in a manner that allows said first gimbal arm to pitch and yaw in 360°;
(b) measuring actual angles of rotation of said second extendable telescoping L-shaped gimbal arm and said third extendable telescoping L-shaped gimbal arm;
(c) determining differences between said actual angles of rotation and predetermined angles of rotation of said second extendable telescoping L-shaped gimbal arm and said third extendable telescoping L-shaped gimbal arm;
(d) if said differences are substantially zero, then rotating said second extendable telescoping L-shaped gimbal arm and said third extendable telescoping L-shaped gimbal arm to said predetermined angles of rotation;
(e) otherwise, converting said differences into voltages which rotate said second extendable telescoping L-shaped gimbal arm and said third extendable telescoping L-shaped gimbal arm to said predetermined angles of rotation.

15. The method of claim 14 wherein said step (b) of measuring actual angles of rotation of said second extendable telescoping L-shaped gimbal arm and said third extendable telescoping L-shaped gimbal arm using a plurality of inertia measurement sensor units.

16. The method of claim 14 wherein said step of (b) measuring actual angles of rotation of said second extendable telescoping L-shaped gimbal arm and said third extendable telescoping L-shaped gimbal arm further comprises:
measuring first total external forces and torques exerting on said second extendable telescoping L-shaped gimbal arm; and
measuring second total external forces and torques exerting on said third extendable telescoping L-shaped gimbal arm.

17. The method of claim 15 said step of (b) measuring actual angles of rotation of said second extendable telescoping L-shaped gimbal arm and said third extendable telescoping L-shaped gimbal arm further comprises associating said first total external forces and said second total external forces to said differences in angles of rotation for said second extendable telescoping L-shaped gimbal arm and said third extendable telescoping L-shaped gimbal arm.

18. The method of claim 15 said step (b) measuring actual angles of rotation of said second extendable telescoping L-shaped gimbal arm and said third extendable telescoping L-shaped gimbal arm further comprises: using associations between said first total external forces and said second total external forces to said differences in angles of rotation to compensate for said difference in angles of rotation.

19. The method of claim 14 wherein said step (c) of determining differences between said actual angles of rotation and predetermined angles of rotation of said second extendable telescoping L-shaped gimbal arm and said third extendable telescoping L-shaped gimbal arm further comprises: using Euler rotation matrices in three dimensional space methods.

20. The method of claim 14 wherein said step (c) of determining differences between said actual angles of rotation and predetermined angles of rotation of said second extendable telescoping L-shaped gimbal arm and said third extendable telescoping L-shaped gimbal arm further comprises: using quaternion transformation in three dimensional space methods.

* * * * *